(12) United States Patent
Goering

(10) Patent No.: US 7,413,999 B2
(45) Date of Patent: Aug. 19, 2008

(54) CORNER FITTING USING FIBER TRANSFER

(75) Inventor: Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 258 days.

(21) Appl. No.: 11/266,709

(22) Filed: Nov. 3, 2005

(65) Prior Publication Data
US 2008/0009210 A1 Jan. 10, 2008

(51) Int. Cl.
*D03D 25/00* (2006.01)
*B32B 3/06* (2006.01)

(52) U.S. Cl. .......................... 442/181; 428/126; 428/57; 428/219; 428/220; 428/111; 428/542.8; 428/12; 428/130; 428/176; 428/193; 428/212; 428/311.51; 428/316.6; 428/81; 442/203; 493/162; 493/243; 493/405; 52/261; 52/344; 52/454; 52/799.12; 410/71; 264/103; 229/172; 229/198.1; 229/199; 139/11

(58) Field of Classification Search ........................ 4/498; 5/81.1 HS, 88.1; 24/287; 52/311.1, 255, 52/344, 443, 454, 717.06, 799.11; 139/11, 139/1 R, 383 R, 384 R, 408, DIG. 1; 156/242; 206/459.5, 586, 813; 220/88.1, 1.5, 23.4, 220/560.08, 62.11; 229/125.19, 199, 176, 229/198.1; 248/151; 264/103; 410/70, 71, 410/77, 82, 85; 428/112, 113, 119, 12, 121, 428/123, 124, 126, 129, 130, 166, 167, 170, 428/171, 174, 175, 178, 188, 192, 194, 198, 428/216, 218, 222, 314.4, 316.6, 317.1, 408, 428/52, 8, 81, 902, 57, 71, 102; 442/218, 442/181, 203, 205; 493/162, 243, 251, 405, 493/51, 68, 69, 79

See application file for complete search history.

(56) References Cited

U.S. PATENT DOCUMENTS

| 3,561,639 | A | * | 2/1971 | Allen .......................... 220/88.1 |
| 4,379,798 | A | | 4/1983 | Palmer et al. |
| 4,521,941 | A | * | 6/1985 | Gerhard ........................ 24/287 |
| 4,615,256 | A | * | 10/1986 | Fukuta et al. ................... 87/33 |
| 4,671,470 | A | | 6/1987 | Jonas |
| 4,725,485 | A | | 2/1988 | Hirokawa |
| 4,777,071 | A | * | 10/1988 | Liu ............................ 428/120 |
| 4,906,506 | A | | 3/1990 | Nishimura et al. |

(Continued)

FOREIGN PATENT DOCUMENTS

JP          06-264325          9/1994

*Primary Examiner*—D. Lawrence Tarazano
*Assistant Examiner*—Shawn R Hutchinson
(74) *Attorney, Agent, or Firm*—Frommer Lawrence & Haug LLP; Ronald R. Santucci

(57) ABSTRACT

A corner fitting and a method of forming a corner fitting including steps of providing a flat woven fabric including a first woven portion having first and second direction woven fibers, a second woven portion adjacent the first woven portion having first direction fibers and sacrificial second direction fibers and a third semi-woven portion having first direction fibers selectively engaged by the sacrificial second direction yarns. The method further comprising steps of folding the flat woven fabric in at least one direction, and removing the sacrificial second direction fibers, wherein during removal, the sacrificial second direction fibers are replaced in the second woven portion by the first direction fibers of the third semi-woven portion and form a corner fitting having continuous fibers connecting all sides.

16 Claims, 8 Drawing Sheets

U.S. PATENT DOCUMENTS

| | | |
|---|---|---|
| 4,922,968 A | 5/1990 | Bottger et al. |
| 5,064,705 A | 11/1991 | Donovan, Sr. |
| 5,100,713 A * | 3/1992 | Homma et al. ............... 428/102 |
| 5,346,774 A * | 9/1994 | Burgess ................... 428/542.8 |
| 5,465,760 A * | 11/1995 | Mohamed et al. ............. 139/11 |
| 5,533,693 A | 7/1996 | Abildskov |
| 5,685,116 A * | 11/1997 | Bradshaw et al. .......... 52/311.1 |
| 5,749,512 A * | 5/1998 | Gingras-Taylor ............ 229/199 |
| 6,019,138 A * | 2/2000 | Malek et al. ................ 139/1 R |
| 6,446,675 B1 | 9/2002 | Goering |
| 6,712,099 B2 | 3/2004 | Schmidt et al. |
| 6,733,862 B2 | 5/2004 | Goering |
| 7,247,212 B2 * | 7/2007 | Kostar et al. ............. 156/89.11 |
| 2002/0081926 A1 | 6/2002 | Goering et al. |

\* cited by examiner

CORNER FITTING USING FIBER TRANSFER

BACKGROUND OF THE INVENTION

1. Field of the Invention

The present invention relates to a perform and a fabrication method for a fiber-reinforced corner fitting that has continuous fibers connecting all sides.

2. Background of the Invention

The use of reinforced composite materials to produce structural components is now widespread, particularly in applications where their desirable characteristics for being lightweight, strong, tough, thermally resistant, self-supporting and adaptability to being formed and shaped are sought. Such components are used, for example, in the aeronautical, aerospace, satellite, and battery industries, as well as for recreational uses such as in racing boats and autos, as well as countless other applications. A three-dimensional fabric may generally comprise fibers with each kind of fiber extending along a direction perpendicular to the other fibers, that is along the X, Y and Z axial directions.

Typically components formed from such fabrics consist of reinforcement materials embedded in matrix materials. The reinforcement component may be made from materials such as glass, carbon, ceramic, aramid (e.g., KEVLAR®), polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials such as very high strength, are imparted to the completed composite component. The constituent reinforcement materials may typically be woven, knitted or otherwise oriented into desired configurations and shapes for reinforcement preforms. Usually, particular attention is paid to ensure the optimum utilization of the properties for which these constituent reinforcing materials have been selected. Generally, such reinforcement preforms are combined with matrix material to form desired finished components or produce working stock for the ultimate production of finished components.

After a desired reinforcement preform has been constructed, matrix material may be introduced and combined with the preform, so that the reinforcement preform becomes encased in the matrix material such that the matrix material fills the interstitial areas between the constituent elements of the reinforcement preform. The matrix material may be any of a wide variety of materials, such as epoxy, polyester, vinylester, ceramic, carbon and/or other materials, which also exhibit desired physical, thermal, chemical and/or other properties. The materials chosen for use as the matrix may or may not be the same as that of the reinforcement preform and may or may not have comparable physical, thermal, chemical or other properties. Typically, however, they will not be of the same materials or have comparable physical, thermal, chemical or other properties as the reinforcement preform, since a usual objective sought in using composites in the first place is to achieve a combination of characteristics in the finished product that is not attainable through the use of one constituent material alone. When combined, the reinforcement preform and the matrix material may then be cured and stabilized in the same operation by thermosetting or other known methods, and then subjected to other operations toward producing the desired component. It is significant to note that after being so cured, the then solidified masses of the matrix material are normally very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desirable to produce components in configurations other than simple geometric shapes such as plates, sheets, rectangular or square solids, etc. For instance, complex three-dimensional components require complex three dimensional preforms. One way to achieve a complex component is to combine basic geometric shapes into the desired more complex forms. One such typical combination is made by joining components made as described above at an angle (typically a right-angle) relative to each other to form lateral and transverse stiffeners. Usual purposes for such angular arrangements of joined components are to create desired shapes to form reinforced structures that include one or more end walls or "T" intersections for example. Another purpose for joining components is to strengthen the resulting combination of reinforcement preforms and the composite structure which it produces against deflection or failure when exposed to exterior forces such as pressure or tension. Therefore, it is important to make each juncture between the constituent components, i.e. the stiffener and the base platform or panel portion, as strong as possible. Given the desired very high strength of the reinforcement preform constituents per se, weakness of the juncture becomes, effectively, a "weak link" in a structural "chain" if not joined appropriately.

Various methods have been used in the past for joining composite components or reinforcement preforms to produce a reinforced complex structure. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component by thermosetting or by an adhesive material. However, when tension is applied to the cured panel or the skin of the composite structure, loads at unacceptably low values often result in "peel" forces which separate the stiffening element from the panel at their interface.

The use of metal bolts or rivets at the interface of such components has also been used but is unacceptable because such additions at least partially destroy and weaken the integrity of composite structures themselves, add weight, increase cost and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panels made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread are then "co-cured": i.e., cured simultaneously.

However, this process requires the preform to be constructed in multiple steps as well as requires the introduction of a third yarn or fiber into the preform.

Another example of an intersecting configuration is set forth in U.S. Pat. No. 6,103,337, the disclosure of which is incorporated herein by reference. This reference discloses a means for joining a reinforcement preform with a preform panel to form a three-dimensional reinforcement preform. The two individual preforms are joined to each other at the junction by means of reinforcing fibers in the form of threads or yarns. Once the two preforms are joined or stitched together, matrix material is introduced to the preforms. However, while this process has many advantages, it does require that the preforms be individually woven or constructed and subsequently stitched together in a separate step. Furthermore, an additional yarn or fiber is needed to connect the preforms.

Another method to improve upon junction strength is set forth in U.S. Pat. No. 5,429,853. However, this method is similar to previously described methods because separately constructed distinct elements are joined together by the stitching of a third yarn or fiber between the two.

While the prior art has sought to improve upon the structural integrity of the reinforced composite and has achieved some success, there exists a desire to improve thereon and to address the problem through an approach different from the use of adhesives or mechanical coupling of the separate panel and stiffener elements. In this regard, one approach might be by creating a woven three-dimensional structure on specialized machines. However, the expense involved is considerable and rarely is it desirable to have a weaving machine directed to creating a simple structure.

Another approach is to weave a two-dimensional structure and fold it into shape so that the panel is integrally stiffened, i.e. yarns are continuously interwoven between the planar base or panel portion and the stiffener. However, this typically results in distortion of the preform when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. These distortions cause undesirable surface anomalies and reduce the strength and stiffness of the component. While this may be relieved by cutting and darting, such procedures are undesirable since they are labor intensive or otherwise may compromise the integrity of the preform.

U.S. Pat. No. 6,446,675, the disclosure of which is incorporated herein by reference, solves the problem with distortion that occurs upon folding a two-dimensional woven preform by adjusting the lengths of the fibers during weaving such that some fibers are too short in some areas and others too long in other areas. Upon folding the preform, the lengths of the fibers are equalized, providing for a smooth transition at the fold. However, this woven preform is only capable of providing reinforcement or stiffening in one direction, which is parallel to the warp fiber direction.

Another approach for constructing stiffened panels is set forth in U.S. Pat. No. 6,019,138 which discloses a method for making stiffened panels with reinforcing stiffeners in both the warp and fill directions. As disclosed, this method achieves reinforcement in two directions through over weaving, or simply weaving high spots into the panel portion of the preform. Using this method will limit the height of the stiffener that can be achieved. Further, this method requires that the preform be woven using three yarns. The third yarn, which binds the stiffener to the panel portion of the preform, is only periodically woven between the two. Therefore, the stiffener is not completely integrally woven with the panel portion which results in a joint that is weaker than a fully integrally woven joint.

A further approach can be found in U.S. Pat. No. 6,733,862, the disclosure of which is incorporated herein by references. The '862 patent describes a fabric suitable as the reinforcement for a three dimensional composite structure. The fiber reinforcement is one that may be woven on conventional weaving machinery. It starts off as a woven two dimensional structure that is then formed into a three dimensional structure, particularly one having deep draws. To provide for this, the reinforcing fabric is woven in a manner that, in portions of the weave, the warp and weft or fill fibers are laid on each other and do not interlock. In this portion the fibers can move independently and slide past one another when the fabric is drawn or folded into shape. If the portion is a rectangular or square shape, it can be collapsed in such a manner that both the warp and weft fibers fold upon themselves and each other to align in an unidirectional manner which creates a corner which acts as a compression column in the final structure.

Thus, three-dimensional preforms which can be processed into fiber reinforced composite components are desirable because they provide increased strength relative to two-dimensional laminated composites. These preforms are particularly useful in applications that require the composite to carry out-of-plane loads. However, even the most advanced heretofore known structures, such as those described in the '862 patent, only have continuous reinforcing fibers in two of the three planes of any corner feature.

Accordingly, a need exists for a woven corner preform or fitting that provides reinforcement in three directions that can be woven using a conventional loom and provides for reinforcing fibers in all three planes of the corner fitting. Further there exists a need for integration of such a corner fitting into a larger preform or structure.

SUMMARY OF THE INVENTION

It is the object of the present invention to improve upon the prior art preforms discussed above.

It is another object of the present invention to provide a corner fitting and a method of forming a corner fitting having continuous fibers connecting all sides.

It is another object of the present invention to provide a corner fitting and a method of forming a corner fitting having continuous fibers connecting all sides that is formed from a flat woven fabric.

One aspect of the present invention is a corner fitting including steps of providing a flat woven fabric including a first woven portion having first and second direction woven fibers or yarns, a second woven portion having first direction fibers and removable or sacrificial second direction fibers adjacent the first woven portion, and a third semi-woven portion having first direction fibers, with said first direction fibers selectively engaged by the sacrificial second direction fibers. Wherein upon removal of the sacrificial second direction fibers, the first direction fibers of the third semi-woven portion replace the sacrificial second direction fibers of the second woven portion and form a corner fitting having continuous fibers connecting all sides.

A further aspect of the present invention is a method of forming a corner fitting including steps of providing a flat woven fabric including a first woven portion having first and second direction woven fibers, a second woven portion having first direction fibers and sacrificial second direction fibers adjacent the first woven portion, and a third semi-woven portion having first direction fibers, with said first direction fibers selectively engaged by the sacrificial second direction fibers. The method further comprising steps of folding the flat woven fabric in at least one direction, and removing the sacrificial second direction fibers, wherein during removal the second direction fibers are replaced in the second woven portion by the first direction fibers of the third semi-woven portion and form a corner fitting having continuous fibers connecting all sides.

Once the corner fitting is created, it can them be made into a composite in any known manner or incorporated into a larger preform or structure which in turn is made into a composite.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
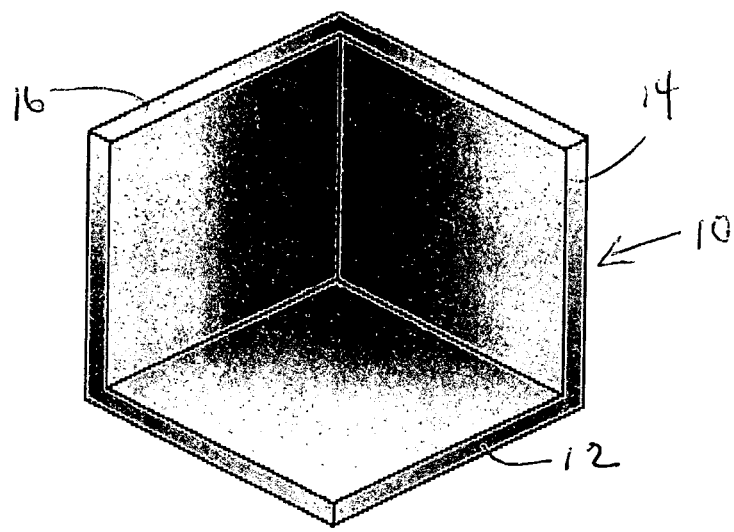
FIG. 1 is an isometric view of a corner fitting according to the present invention.

The present invention is a fiber reinforced corner preform or fitting and a method of forming a fiber-reinforced corner fitting that has continuous fiber connecting all sides. A corner fitting 10 is shown in FIG. 1. The corner fitting 10 consists of three sides 12, 14, and 16 that are mutually perpendicular. Such fittings are often used to reinforce corners where several independent pieces are joined together. They are very common in aerospace structures at rib/spar/skin intersections in wings, and at frame/stringer/skin intersections in the fuselage.

In composite structures, it is beneficial to have the corner fitting made from the same material as the other components, because all of the parts will have similar coefficients of thermal expansion. It is also desirable that the fitting has continuous fiber connecting each side. This can be accomplished by overlapping and bonding three 'L' shaped components, but the bond lines in the resulting fitting are weak areas that will typically be the initial points of failure. Accordingly, the fiber-reinforced corner fitting of the instant application is directed to an integrally woven preform that has continuous fibers around all three corners.

Figure 2:
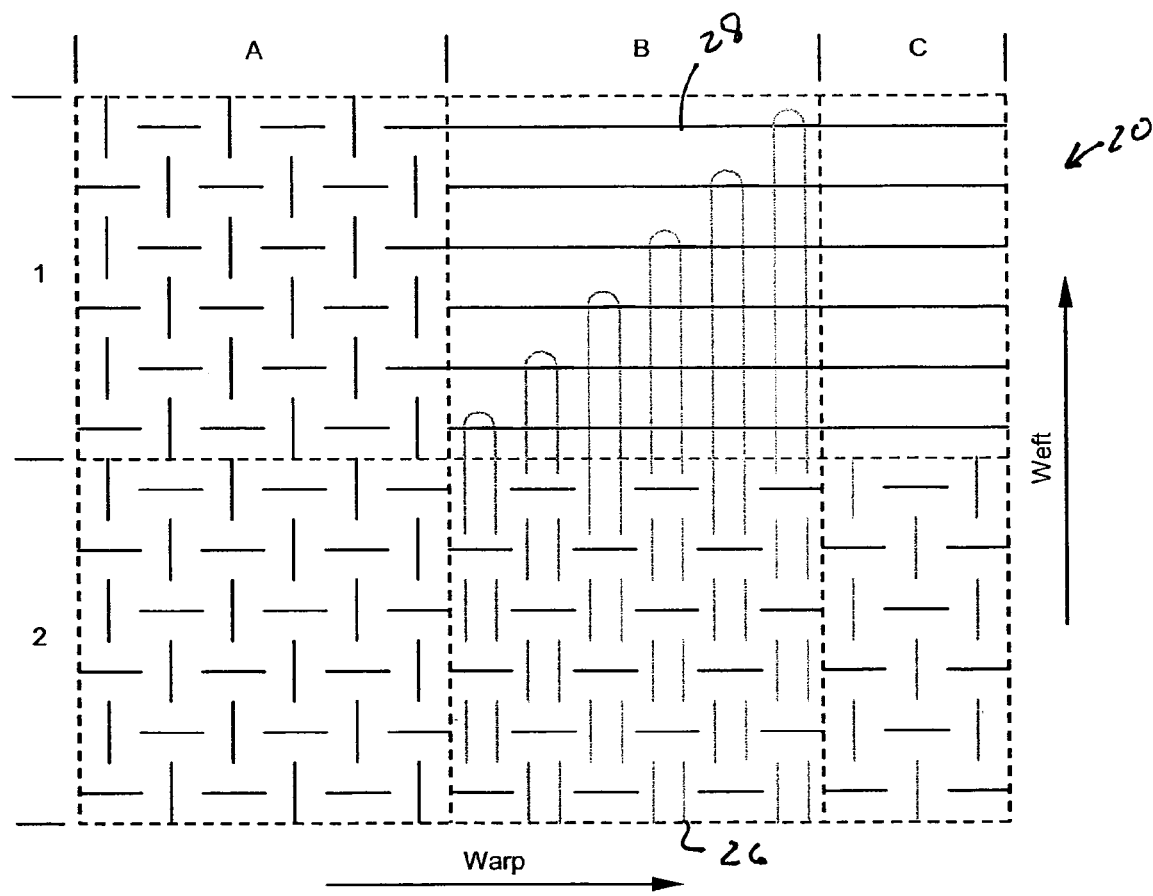
FIG. 2 is a plan view of a flat woven corner fitting according to the present invention.

Fabrication of the corner fitting is done in three steps. First, a flat preform 20, as shown in FIG. 2, is woven using a conventional loom. Next, the flat preform is loaded into a fixture and fiber from one area of the preform is drawn into another section, as will be described in detail below. Finally, the removable or sacrificial fiber is trimmed away, leaving the final corner fitting 110 shown in FIG. 8. The second step is referred to as a 'fiber transfer' step, and is shown in detail in FIGS. 3-8.

The initial flat preform 20 is shown schematically in FIG. 2. The flat preform 20 can be described with reference to primary fiber woven into the flat preform 20 that will remain in the corner fitting 110, and sacrificial or secondary fibers that will be removed in forming the corner fitting 110.

FIG. 2 depicts sections A1 and A2. Sections A1 and A2 are woven with primary fiber in the warp and weft directions. These sections form the upper left 116 and lower sides 112 of the corner fitting 110 shown in FIG. 8.

Section B1 has primary fiber in the warp direction and sacrificial fiber in the weft direction. Weft fibers float over most warp fibers, but make a loop around one (and only one) specific warp fiber. Since the weft fibers loop around only one warp fiber it will be referred to as being semi-woven. This warp fiber will eventually be transferred into the position of the sacrificial weft in section B2 to form the upper right side 114 of the corner fitting 110 shown in FIG. 8. Section B2 has primary fiber in the warp direction weaving with sacrificial fiber in the weft direction. The warp fiber in section B1 will eventually replace this weft fiber.

Section C1 contains unwoven primary fiber in the warp direction; there is no weft fiber in this section. This excess fiber will eventually be trimmed away. Section C2 has sacrificial fiber in the warp direction weaving with sacrificial fiber in the weft direction. This section stabilizes section B2 during the fiber transfer and is eventually trimmed away. An isometric view of the flat preform is shown in FIG. 3.

A note on the woven sections of the initial preform, there are really no restrictions to the type of fiber that is used or on the basic weaving pattern. The initial preform could even be a multi-layered design. More complicated design may make the fiber transfer process more difficult, however, these are nonetheless considered within the scope of the instant invention.

Figure 3:
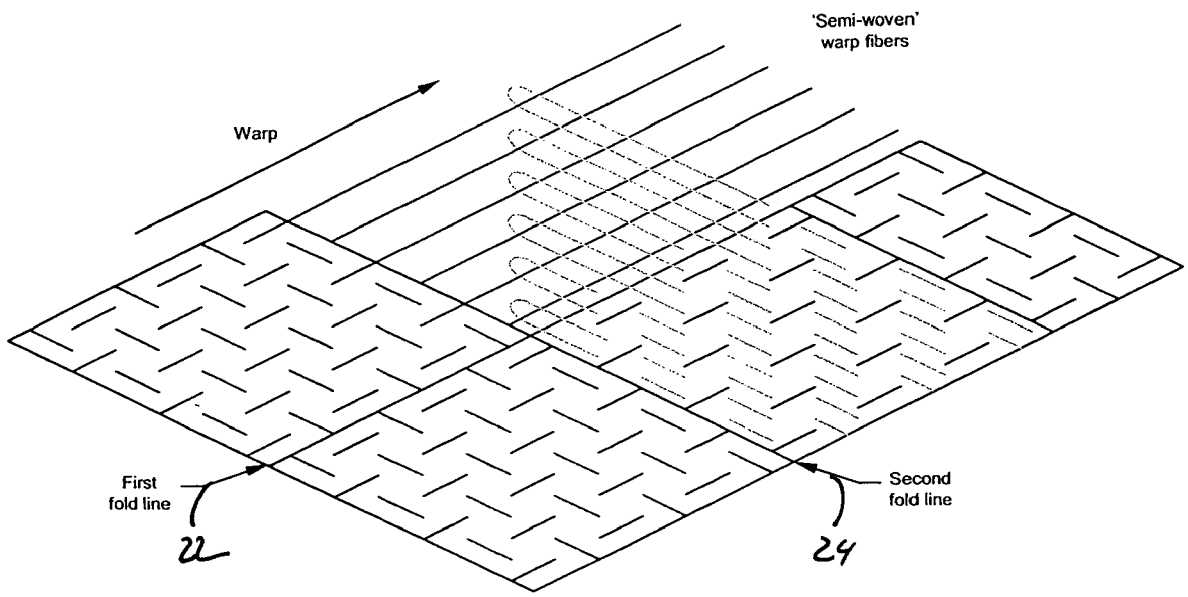
FIG. 3 is an isometric view of the flat woven corner fitting of FIG. 2.
Figure 4:
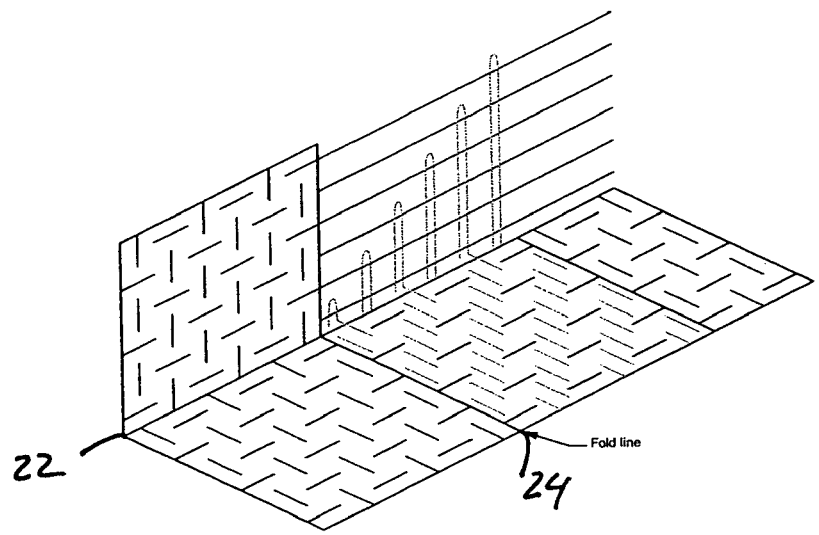
FIG. 4 depicts the flat woven corner fitting of FIG. 2 after a first fold.
Figure 5:
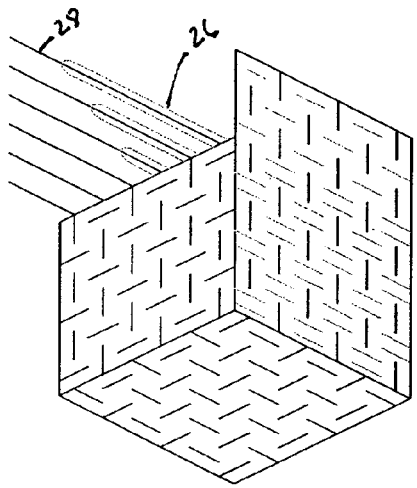
FIG. 5 depicts the flat woven corner fitting of FIG. 2 after a second fold.
Figure 6:
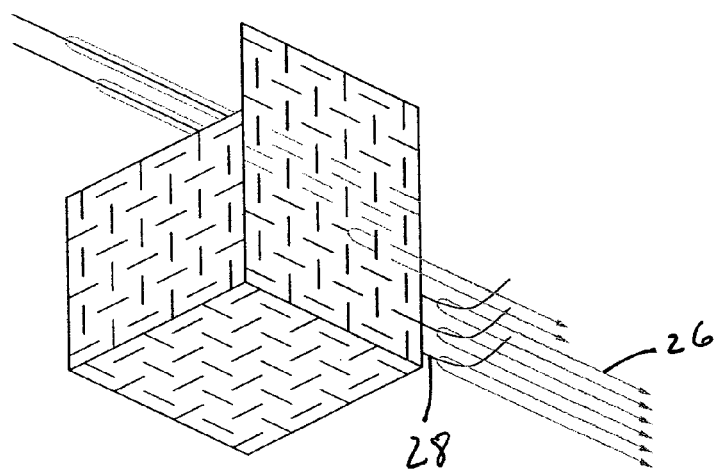
FIG. 6 depicts the flat woven corner fitting of FIG. 2 during fiber transfer.

As shown in the progression from FIG. 3 to FIG. 5, initial forming of the corner fitting 110 is accomplished by folding along the two fold lines identified in FIG. 3, shown as 22 and 24 respectively. Completion of folds along lines 22 and 24 is illustrated in FIGS. 4 and 5, respectively.

Figure 7:
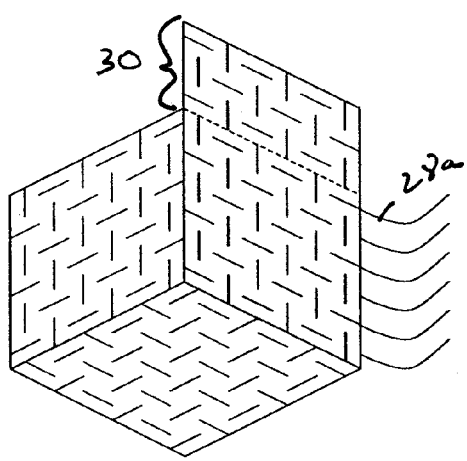
FIG. 7 depicts the flat woven corner fitting of FIG. 2 after the fiber transfer is complete.
Figure 8:
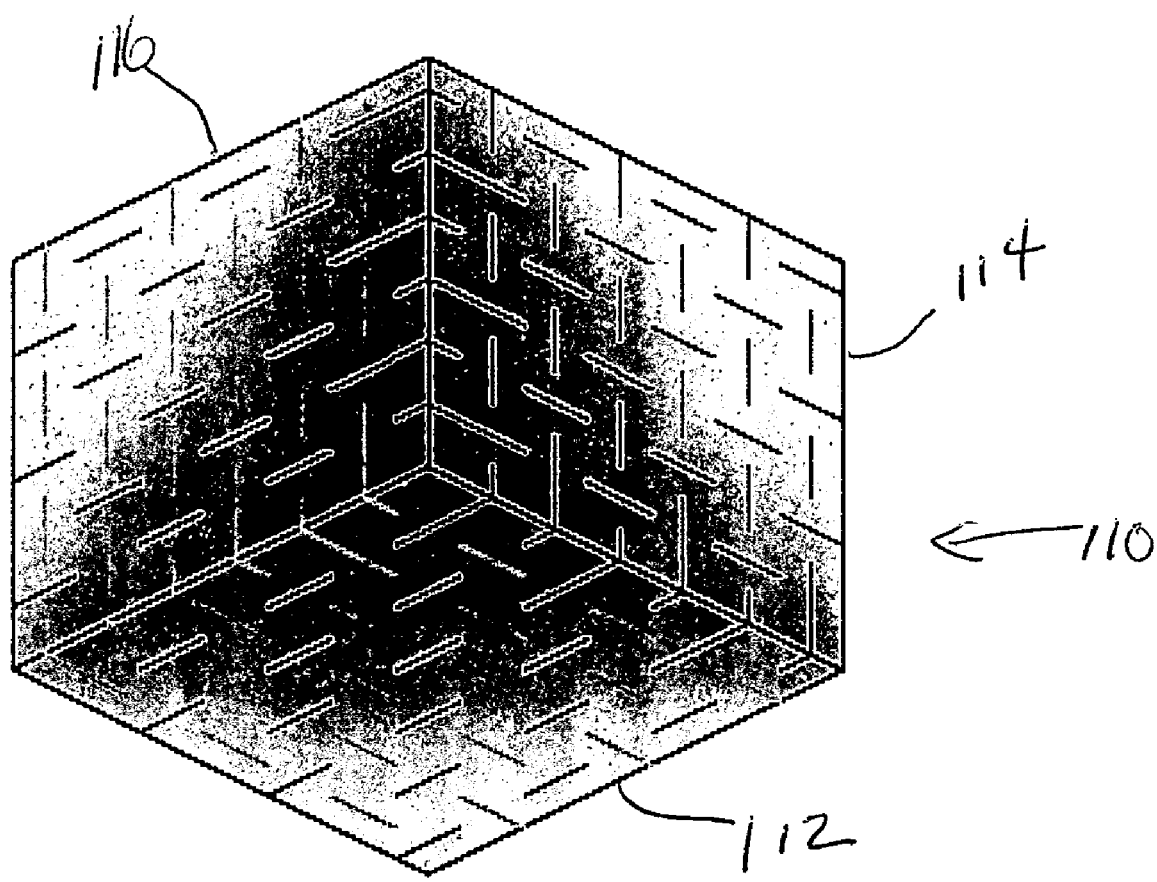
FIG. 8 depicts the final structure of the flat woven corner fitting of FIG. 2.

As shown in FIG. 5, the fitting is in position to facilitate the fiber transfer step. Fiber transfer is accomplished by pulling each of the sacrificial weft fibers 26 in section B2 out of the preform 20. When this is done, the warp fibers 28 in section B1 will be pulled into the locations that were occupied by the sacrificial weft fibers 26. A specific warp fiber 28 in section B1 will then occupy the position in section B2 that was originally occupied by the sacrificial weft fiber 26 that was looped around it. This process is shown in the progression from FIG. 5 to FIG. 7 The final step in the forming process is to trim away the excess fiber at 28a. This consists of the warp fibers from section B1 that have been pulled completely through section B2, and all of section C2, (labeled 30), as shown in FIG. 7. The resulting corner fitting 110 is shown in FIG. 8. As can be seen in this figure, there is continuous fiber around all corners. The corner fitting 110 may then itself be made into a composite and used as a strengthening element or incorporated into a larger preform or structure which is made into a composite or otherwise used as desired.

EXAMPLE

Figure 9:
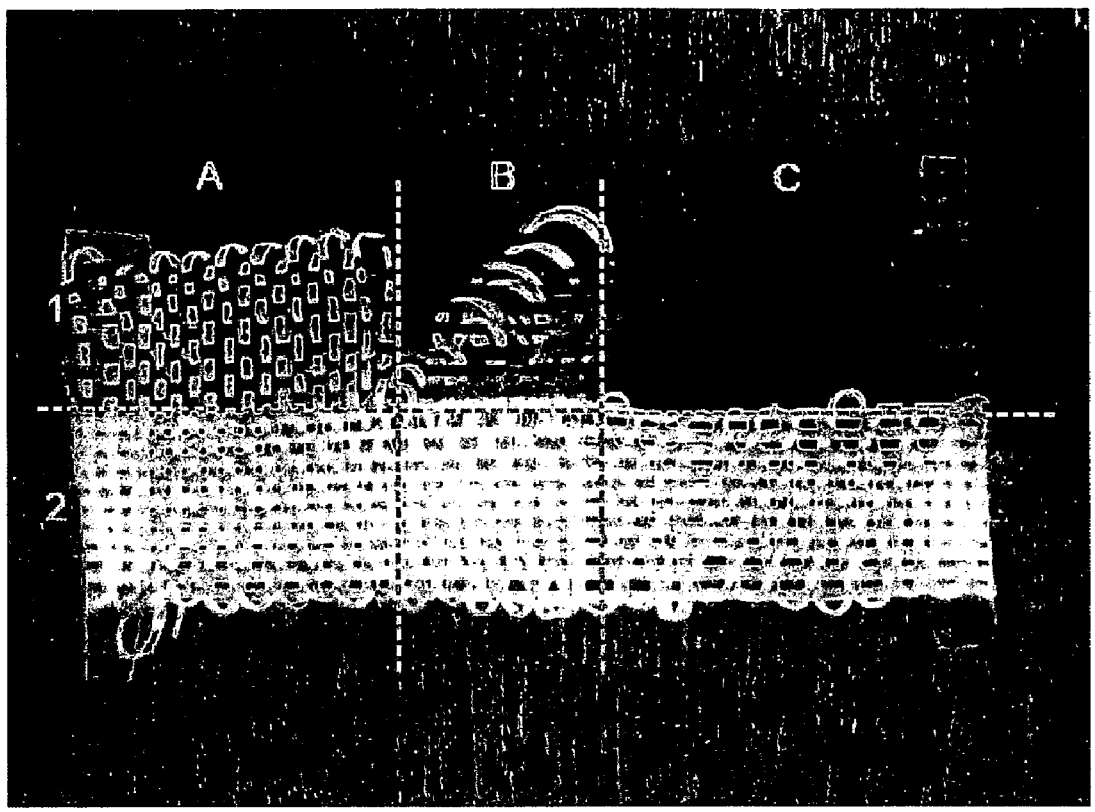
FIG. 9 depict an actual prototype flat woven corner fitting of the type shown in FIG. 2.

A prototype preform has been woven to validate this approach. This preform was woven using a combination of aramid, carbon, and glass fibers to demonstrate the applicability of the approach to a variety of fibers, and to clarify the fiber paths in the resulting preform. Note, while the fibers used were those listed and could be typical reinforcing fibers aforementioned used in composite structures, this invention is applicable to fibers made of any material suitable for the purpose and accordingly is not limited to the material mentioned herein. This preform was woven on a conventional shuttle loom. The flat woven preform is shown in FIG. 9. A grid has been superimposed thereon so that the regions A1-C2 defined in FIG. 2, can be easily identified.

The preform shown in FIG. 9 was woven using a plain weave pattern. This pattern was chosen because it includes more crimp than other common patterns, such as twills or satins, and presents the most difficult challenge for the fiber transfer process in a single layer fabric. As previously mentioned, any weave pattern could be used. The only pattern that cannot change is in section B1 where each weft fiber must loop around a single warp fiber. In addition, the loops must progress in length from the lower left corner of section B1 to the upper right.

The preform shown in FIG. 9 was loaded into a forming fixture/fiber transfer aid, which folds it into shape and prepared sections B1 and B2 of the fiber transfer process. A prototype preform loaded into the fixture is shown in FIGS. 10 and 11.

Figure 10:
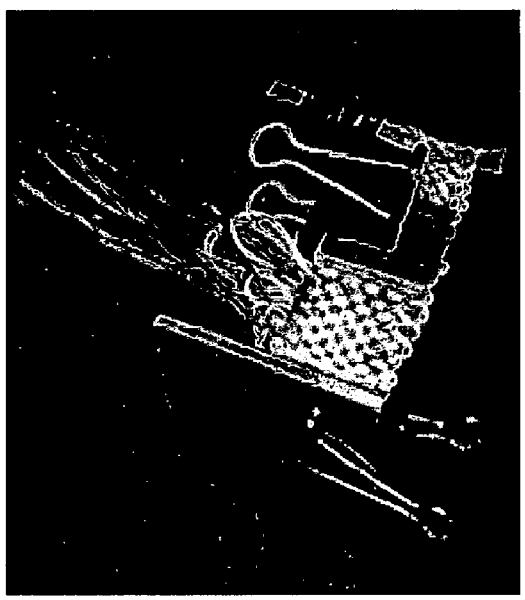
FIGS. 10-11 depict the folding and weaving process of the flat woven corner fitting of FIG. 9.
Figure 11:
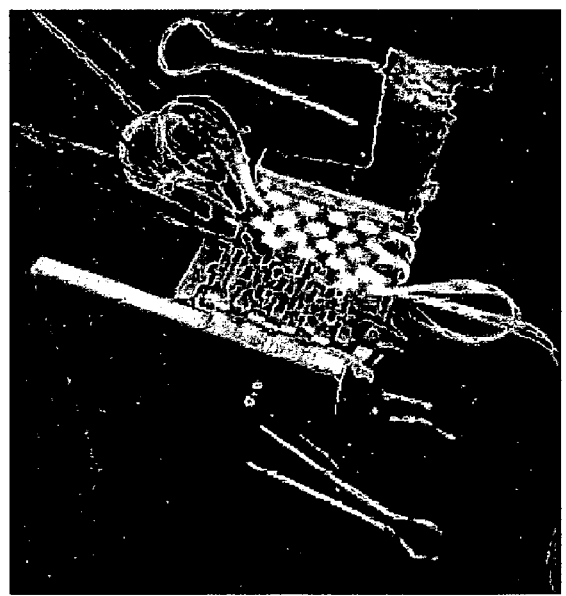

FIG. 10 shows the preform prior to the fiber transfer. FIG. 11 shows the preform during the fiber transfer. The caul plates help stabilize various portions of the preform during the fiber transfer and help minimize distortion. After completing the fiber transfer process, the sacrificial fiber was trimmed away, resulting in the corner fitting shown in FIG. 12. Note the continuous aramid fibers 120, carbon fibers 122, and glass fibers 124 around the various corners.

Figure 12:
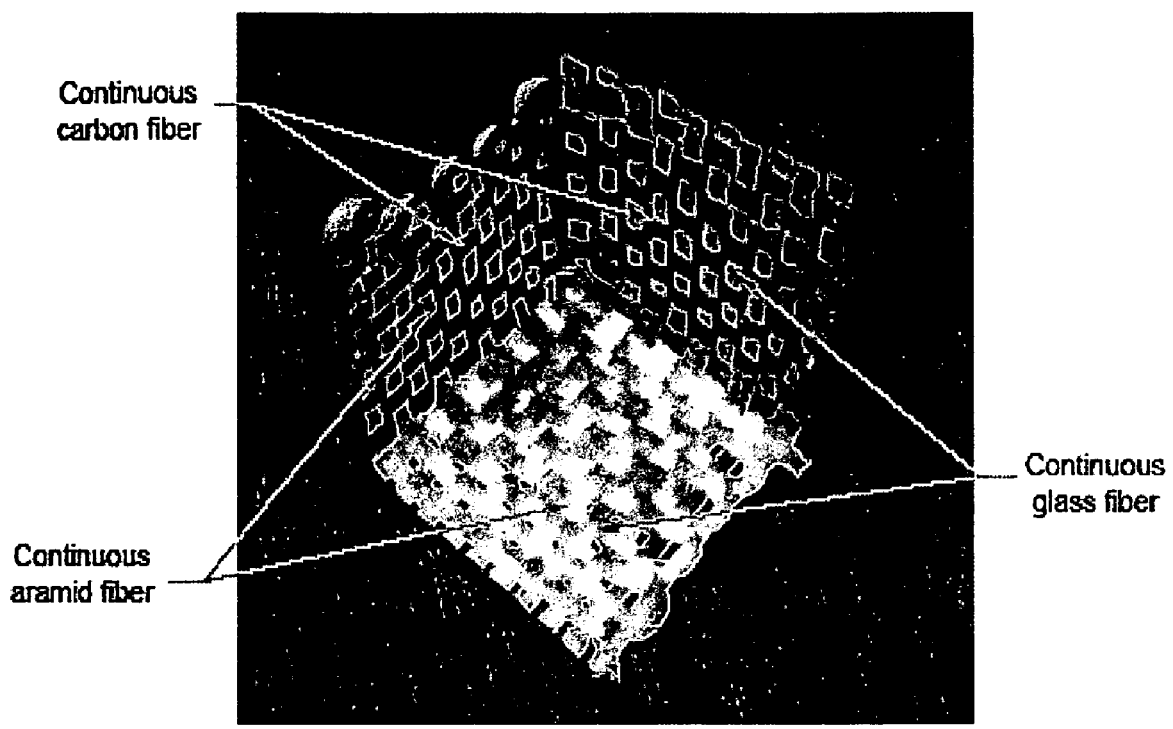
FIG. 12 depicts the final structure of the flat woven corner fitting of FIG. 9.

The corner fitting shown in FIG. 12 was woven on a machine, but the fiber transfer was accomplished by hand. The individual steps required to fold the preform and extract the sacrificial weft are readily automated. For, example, in a production environment, the flat preforms can be woven continuously and wound onto a roll. This roll of flat preforms could then be loaded into a second machine that accomplishes the folding, fiber transfer, and final trimming. It can thereafter be made into a composite structure itself or incorporated into a larger preform structure which is then formed into a composite.

Figure 13:
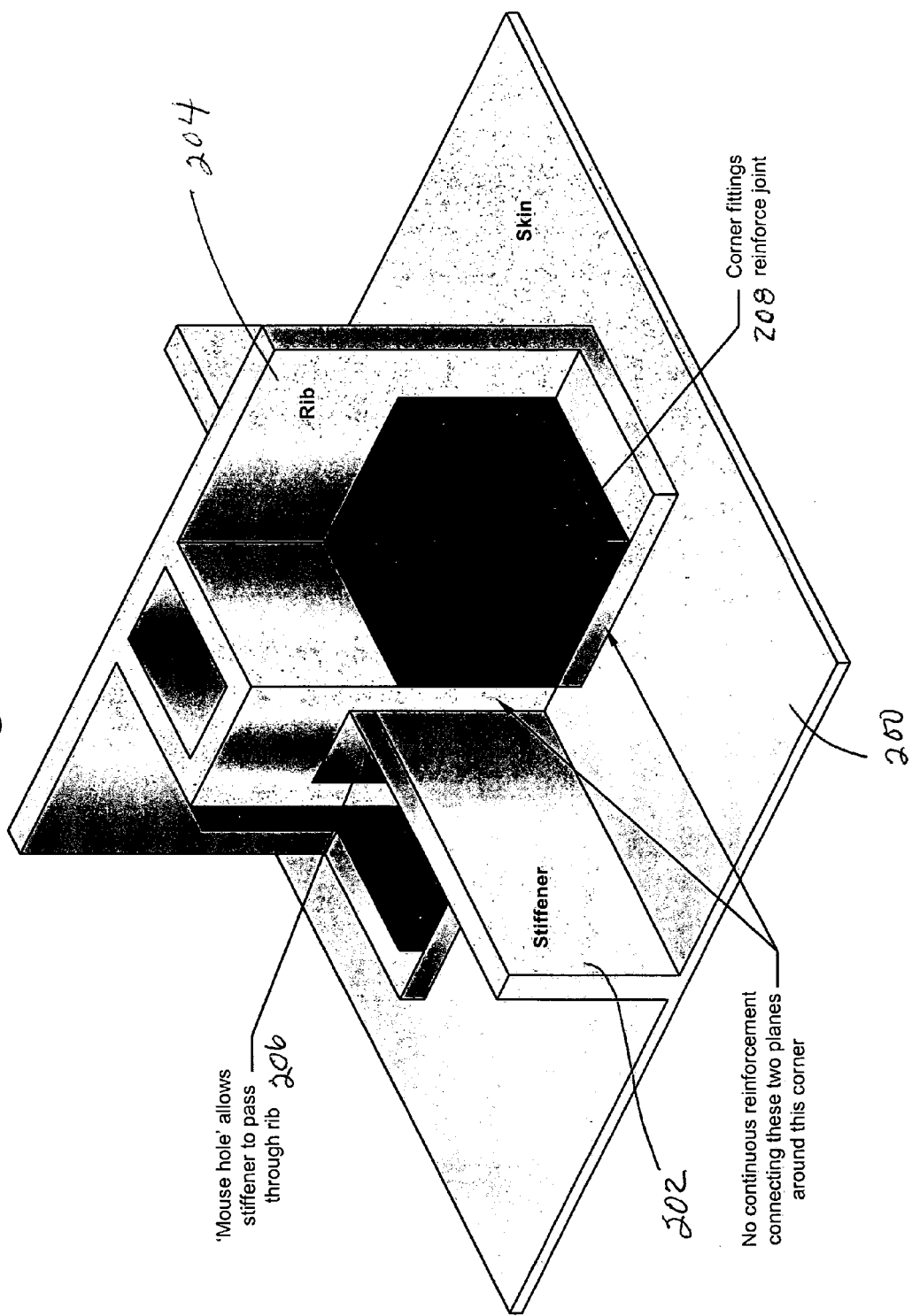
FIG. 13 depicts the implementation of a corner fitting as reinforcing member.

The present invention has been described primarily herein with respect to the formation of a corner fitting. In application such a corner fitting may be used in situations where it is desirable to reinforce a joint of two or more sections of an apparatus. For example in the aerospace industry there is often need to reinforce the joint between a skin material and an instance where both longitudinal and transverse stiffeners are supporting the skin. Such an example is shown in FIG. 13, where a skin material 200 includes an integral stringer 202. To help support the skin 200 a support 204 is attached to the skin 200. A mouse hole 206 in the support allows the support to be placed over the stringer 202 of the skin 200. To reinforce these joints a corner fitting 208 is applied to one or more sides of the intersection of the stringer 202 and the support 204.

Figure 14:
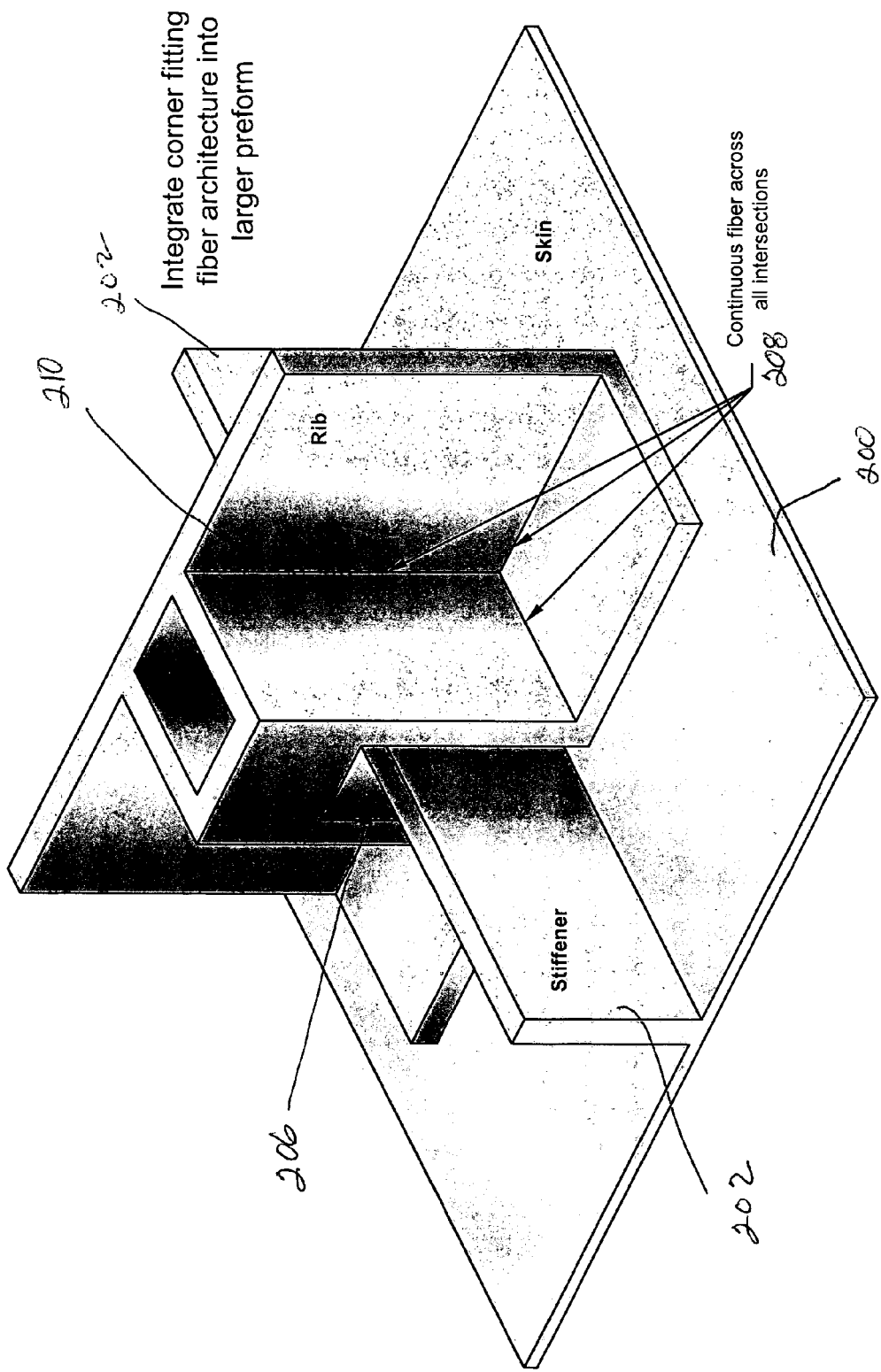
FIG. 14 depicts an integrated corner fitting as part of a larger preform or structure.

Another embodiment of the present invention is shown in FIG. 14, where the support 210 is formed by the process described above and has integral within its design a corner 208 formed with continuous fibers across the intersections of the three planes of the corner. As can be readily appreciated the increased strength from this design allows for an elimination in some instances of a reinforcement corner as shown in FIG. 13.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A corner fitting formed out of a folded flat woven fabric comprising:
    a first woven portion having first and second direction woven fibers;
    a second woven portion adjacent the first woven portion having first direction fibers and sacrificial second direction fibers; and
    a third semi-woven portion having first direction fibers selectively engaged by the sacrificial second direction fibers, wherein upon removal of said sacrificial second direction fibers, said first direction fibers of said third semi-woven portion replace the sacrificial second direction yarns of said second woven portion and form a corner fitting having continuous fibers connecting all sides.

2. The corner fitting of claim 1 wherein the first direction fibers are warp fibers, the second direction fibers are weft fibers and the sacrificial second direction fibers are weft fibers.

3. The corner fitting of claim 1, wherein the flat woven fabric is a multi-layer fabric.

4. The corner fitting of claim 1, wherein the first and second direction fibers are selected from the group consisting of glass, carbon, ceramic, aramid, and polyethylene fibers.

5. The corner fitting of claim 1, wherein the first and second direction fibers are encased in a matrix material which creates a composite.

6. The corner fitting of claim 1, which is integrated into a larger preform or structure.

7. The corner fitting of claim 6, wherein said larger preform or structure is encased in a matrix material which creates a composite.

8. A method of forming a corner fitting comprising the steps of:
    providing a flat woven fabric including a first woven portion having first and second direction woven fibers, a second woven portion adjacent the first woven portion having first direction fibers and sacrificial second direction fibers and a third semi-woven portion having first direction fibers selectively engaged by the sacrificial second direction fibers;
    folding said flat woven fabric in at least one direction; and removing said sacrificial second direction fibers, wherein during removal said sacrificial second direction fibers are replaced in said second woven portion by the first direction fibers of the third semi-woven portion and form a corner fitting having continuous fibers connecting all sides.

9. The method of claim 8, further comprising a step of encasing the first and second direction fibers in matrix material which creates a composite.

10. The method of claim 8 further comprising a step of cutting portions of the first direction fibers of the third semi-woven portion extending past an end of said second woven portion after removal of the sacrificial second direction fibers of said second woven portion.

11. The method of claim 10, further comprising a step of trimming a portion of said second woven portion.

12. The method of claim 8 wherein the first direction woven fibers are warp yarns, the second direction fibers are weft fibers and the sacrificial second direction fibers are weft fibers.

13. The method of claim 8, wherein the flat woven fabric is a multi-layer fabric.

14. The method of claim 8, further comprising a step of selecting the first and second direction fibers from the group consisting of glass, carbon, ceramic, aramid, and polyethylene fibers.

15. The method of claim 8 wherein said corner fitting is included into a larger preform or structure.

16. The method of claim 15 wherein said larger preform or structure is encased in a matrix material which creates a composite.

* * * * *